Figure 1:
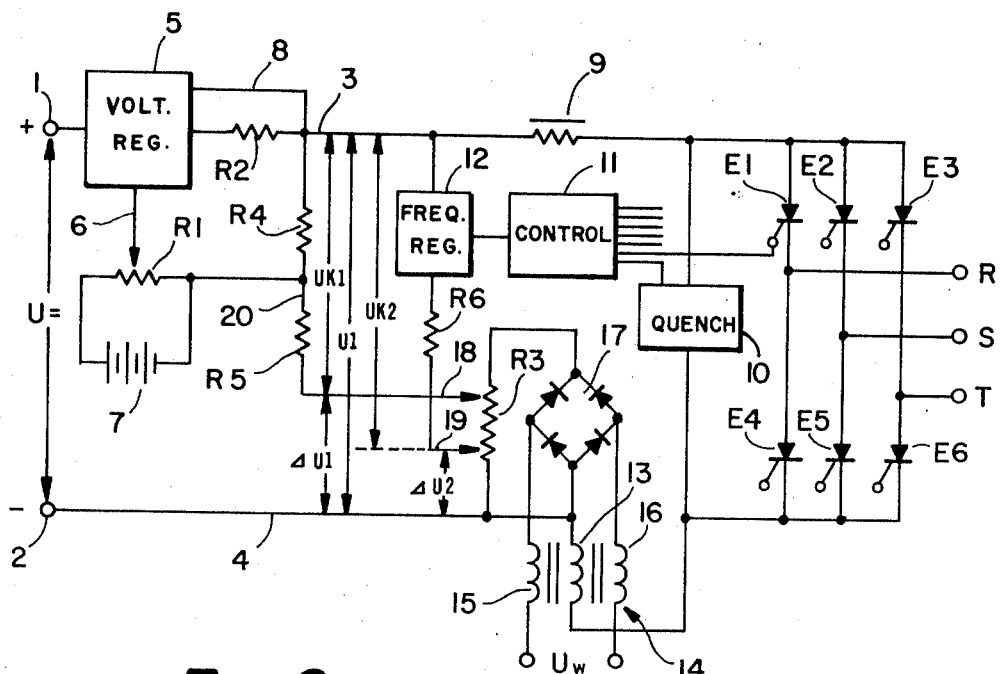

United States Patent
Jensen

[15] 3,700,989
[45] Oct. 24, 1972

[54] CONTROL SYSTEM FOR AN ALTERNATING CURRENT MOTOR

[72] Inventor: Arne Jensen, Skolegade, Havnbjerg, near Nordborg, Denmark

[73] Assignee: Danyoss A/S., Nordborg, Denmark

[22] Filed: March 31, 1971

[21] Appl. No.: 129,966

Related U.S. Application Data

[63] Continuation of Ser. No. 805,177, March 7, 1969, abandoned.

[30] Foreign Application Priority Data

March 16, 1968 Germany..........P 16 13 775.0

[52] U.S. Cl. ...................318/227, 318/230, 318/231
[51] Int. Cl. .............................................H02p 5/40
[58] Field of Search......................318/227, 230, 231

[56] References Cited

UNITED STATES PATENTS 3,402,336   9/1968   Risberg.....................318/227

*Primary Examiner*—Gene Z. Rubinson
*Attorney*—Wayne B. Easton

[57] ABSTRACT

The invention relates to a control system for an alternating current motor such as a polyphase induction motor. The control system includes a DC to AC inverter in combination with voltage and frequency regulators with the voltage and frequency being dependent upon each other. Control means are provided which sense the inverter current and translate the data sensed into two voltages which are separately subtracted from the output of the voltage regulator to provide two corrected voltages for regulating the voltage regulator and the frequency regulator.

3 Claims, 3 Drawing Figures

CONTROL SYSTEM FOR AN ALTERNATING CURRENT MOTOR

This application is a continuation of application Ser. No. 805,177, filed Mar. 7, 1969, now abandoned.

The invention relates to a control system for an alternating-current motor, particularly a polyphase induction motor, comprising a DC to AC inverter, which is fed by way of a voltage regulator with a regulated direct-current voltage and is powered by means of a frequency regulator having a regulated frequency, voltage and frequency being dependent upon each other and the actual voltage at the output of the voltage regulator being used for regulation purposes.

Such control systems are primarily used for controlling the speed of the motor. A change in frequency is followed by a change in motor speed. The reactance of the motor, however, also rises with frequency, so that to maintain approximately similar magnetic flux distribution conditions, the voltage is raised with the frequency. Here, the relationship between frequency and voltage is usually linear.

Control systems of this kind are known wherein the required frequency is set and the voltage is regulated in dependence thereon. Here, some disadvantages occur, however. In normal operation, at least in the case of asynchronous motors, a certain slip occurs depending upon the loading. Particularly in the case where the speed is set at a low level, the change in the actual speed, caused by changes in loading, is relatively large. Furthermore, when the frequency is low, as required for obtaining low speeds and, under some circumstances, for the purpose of starting up, operating conditions arise wherein the frequency-dependent voltage no longer suffices for sending a current, sufficient for magnetization, through the motor, since the constant ohmic resistances are too great in relation to the inductive resistances that vary with frequency; if, however, the magnetization drops, slip increases and so does the change in speed dependent upon loading. The motor employed can be designed for only one given operating point, e.g. 50 cycles, 220 V, so that these disadvantages cannot be removed by changes in the construction of the motor.

The object of the invention is to provide a control system whereby a commercial alternating-current motor can be so driven that the above-mentioned difficulties regarding magnetization and/or speed can be removed, at least in part.

According to the invention, this object is achieved by deducting a value for voltage, derived from the inverted converter current, from the actual voltage and using the voltage so corrected as the control or regulating factor.

This step results in a correction of one or more variable factors in such manner that magnetization and/or speed can be kept at least approximately constant, to suit requirements.

In a first preferred embodiment, the corrected voltage is compared with the nominal value of the voltage regulator and the actual voltage is set in dependence thereon. The nominal value is therefore compared with an artificially lower voltage. Consequently, the actual voltage is in each case greater than the nominal value, which is set in dependence upon frequency or as a primary control factor. The voltage, increasing with the rising inverter current, results in compensation of slip. Furthermore, it may balance out too great an effect of the ohmic voltage drop, so that magnetization remains approximately constant.

In a second preferred embodiment, the corrected voltage is used as the control factor for the frequency regulator. The frequency is thus a variable dependent upon voltage and the inverter current. It is kept artificially lower than corresponds to a prescribed voltage. Consequently, the inductive resistance is reduced in comparison with the ohmic resistance, so that this measure also contributes towards the maintenance of an adequate magnetizing current.

It is of particular advantage to adopt both measures at the same time. If provision is made for a first corrected voltage for the frequency regulator to be lower than the second corrected voltage for the frequency regulator, optimum conditions are created as will be explained in more detail below.

The voltage used for correcting the actual voltage is expediently produced by means of a control resistor through which flows a current proportional to the inverter current. If the voltage-drop at the control resistor is connected in series in the negative direction with the actual voltage, the corrected voltage can be picked up direct. It is also possible to obtain the two voltages used for the correction with the help of two tappings from the same resistor.

To avoid losses in the inverter circuit, it is advantageous to cause the inverted current to flow through a series inductor, the AC-fed secondary windings of which are in series, and to feed the control resistor with direct current through a rectifier arrangement. Although only the active components of the inverter current are here transmitted to the control circuit, this is nevertheless permissible, since the cos $\rho$ is relatively small in normal operation.

If such precautions are taken, the frequency regulator can have a linear voltage-frequency characteristic curve, and this results in a very simple design of apparatus.

In a further preferred arrangement, the voltage regulator has a current-limiting switching means, which, when a limiting value for current is exceeded, reduces the actual voltage by cutting out the normal voltage regulation operation. A current-limiting switching means of this kind ensures that the inverter and the motor can never be overloaded. This also applies in the case of starting up. Nevertheless, the control system of the invention enables starting up to take place properly with adequate magnetization, so that the motor can also start up under load.

In a particularly expedient arrangement, the voltage regulator is fed with constant DC voltage and an electronic switch lets through impulses of constant repetition frequency but variable width, the impulse width and/or the repetition frequency being reduced when the limit for current is exceeded.

Figure 2:
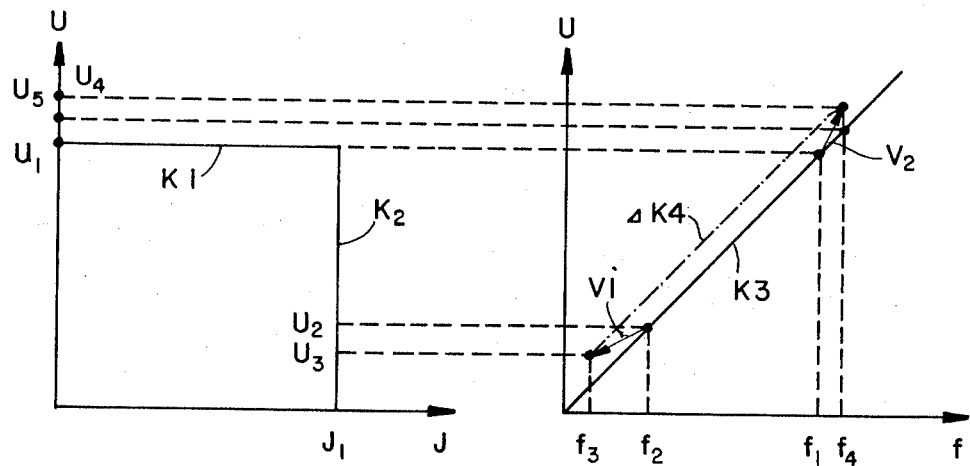

The invention will now be described in greater detail by reference to an embodiment illustrated in the drawing, wherein:

FIG. 1 is a schematic connection diagram for the control system of the invention, FIG. 2 shows the current-voltage diagram for the voltage regulator, and FIG. 3 is a voltage-frequency diagram for the frequency regulator.

A constant direct-current voltage U= is applied to the terminals 1 and 2, associated with the supply leads 3 and 4. Contained in the supply lead 3 is a voltage regulator 5, which produces an actual voltage value $U_i$ in dependence upon a nominal value which is determined by the position of a tapping 6 at a control resistor R1 which is fed by a battery 7. Also, with the help of a conductor 8, the voltage-drop is tapped at a measuring resistor R2 in the supply lead 3. As soon as a prescribed voltage drop, i.e. a predetermined limiting value of the inverter current is exceeded, the normal voltage regulation is rendered ineffective and the voltage $U_i$ is reduced to an extent such that no harmful excess current flows through the inverted converter.

The voltage regulator 5 may, for example, be of a design such as is described in U.S. patent application Ser. No. 792,684, filed Jan. 21, 1969; this consisting substantially of an electronic switch, a filter circuit connected at the output side thereof and an impulse-control circuit. For the purpose of regulating the voltage, the switch is opened at a constant repetition frequency, but is closed again after different periods of time. As soon as the limiting value for current is exceeded, the repetition frequency is reduced, so that the initial voltage has a correspondingly small value.

The voltage is passed through impedance 9 to a DC to three phase inverter, which comprises six controlled rectifiers E1 – E6 and a common quenching circuit 10 and from which the three phases R, S and T are tapped off. The drawing will be understood as being merely schematic. Numerous standard items such as free-running diodes are not shown. The quenching circuit and the controlled rectifiers are controlled by a unit 11 which in turn is connected to a frequency regulator 12. The control unit 11 sends to the quenching circuit impulses of a frequency six times as great as the frequency prescribed by the frequency regulator 12, and the controlled rectifiers E1 – E6 receive control impulses for that period of time during which they are to be struck. The frequency regulator 12 and the control unit 11 can be of a design such as is described, for example, in earlier U.S. patent application Ser. No. 792,685, filed Jan. 21, 1969.

Connected to the supply lead 4 is the primary winding 13 of a series inductor 14, the two secondary windings 15 and 16 of which, together and with a bridge rectifier 17, are connected in series to a constant alternating voltage $U_w$. A control resistor R3 is connected in the bridge of the rectifier arrangement. This resistor has a first tapping 18, which is connected in series with two voltage-divider resistors R4 and R5, at the connecting point 20 of which the voltage used for the comparison with the nominal voltage value is tapped off. A further tapping 19 is arranged in series with a resistor R6 and the frequency regulator 12. A current flows through the resistor R3 that is proportional to the active current in the supply lead 4. Consequently, a voltage-drop $\Delta U_1$ and $\Delta U_2$ is produced between the supply lead 4 and the tappings 18 and 19 respectively, and this means that the voltage regulator 5 and the frequency regulator 12 do not receive a voltage proportional to the actual voltage value $U_i$, but corrected voltage $U_{k2}$. The corrected voltage $U_{K1}$ received by the voltage regulator 5 has the value $U_i - \Delta U_1$, and the corrected voltage $U_{k2}$ for the frequency regulator 12 has the value $U_1 - \Delta U_2$.

The mode of operation of this control system is seen from considering the characteristic curves for the voltage regulator 5 and the frequency regulator 12, as seen in FIGS. 2 and 3. The required speed is set with the help of the tapping 6 at the resistor R1. The frequency follows this adjustment, since it is substantially dependent upon the actual voltage value $U_i$. For a given nominal voltage value $U_1$ (FIG. 2) the voltage regulator 5 seeks to keep the initial voltage at a constant value $U_1$ (branch K1 of the curve) until the limiting value $I_1$ for current is reached. Then the voltage is reduced to such an extent (branch K2 of the curve) that the current value $I_1$ is maintained. The frequency regulator 12 provides for the initial frequency f being proportional to the voltage applied to it (curve K3). The following operating points can then be distinguished:

a. Let it be assumed that a certain nominal voltage value is set with the help of the tapping 6 at the resistor R1. The co-ordinates $(U_1, f_1)$ correspond to this nominal value. If the voltage U= is now applied to the terminals 1 and 2, the motor, which is still stopped, receives a very heavy current. This increases to the value $I_1$. Without compensation the working point would be given by ($I_1$, $U_2$ and $f_2$). Compensation takes place, however, through the resistor R3. This compensation has no direct influence on the voltage regulator, since the latter is controlled only by the current at that moment. On the other hand, the frequency is reduced to the value $f_3$. This causes the inductive resistance of the motor to drop, whilst the ohmic resistance remains constant. Since, furthermore, the current is kept constant, the voltage necessary for maintaining the current also drops to the value $U_3$. This value is raised however, relative to the characteristic curve $K_3$ relating to the frequency $f_3$. This is tantamount to a compensation of the ohmic voltage drop or, expressed in other words, to maintenance of the magnetization of the motor. The latter therefore has a high starting torque. The new working point is then ($I_1$, $U_3$ and $f_3$). The compensation can be expressed by the vector $V_1$.

b. As the motor starts up, the motor impedance increases. Voltage and frequency increase with the current constant, and the vector V shifts along the dot-and-dash line K4.

c. When frequency and voltage reach a value at which the current falls below the limiting value, the voltage regulating means comes into operation. Since the voltage regulator 5 seeks to adjust the actual voltage $U_i$ in such a way that the corrected voltage $U_{k1}$ corresponds to the nominal value, $V_t$ rises from $U_1$ to $U_4$. Since, however, this higher voltage also acts upon the frequency regulator 12, the latter produces a higher frequency, which is of course not proportionally higher, but of a reduced extent on account of the inverse compensation by means of the tapping 19, so that the new working point $(U_4, f_4)$ results instead of the working point $(U_1, f_1)$. This compensation can be represented by the vector $V_2$. Here, the difference $f_4 - f_1$ represents a compensation of the slip dependent upon the active current. The difference $U_4 - U_1$ serves partly to compensate slip (through the component $U_5 - U_1$) and partly to compensate the drop in voltage (through the component $U_4 - U_5$).

The tappings 18 and 19 must be suited to the characteristics of the motor. The tapping 19 for the frequency regulator 12 is so adjusted by means of a starting up test that the motor starts up under a given load. The tapping 18 for the voltage regulator is adjusted in a loading test in such manner that the speed corresponds to the required nominal speed under full load.

In this manner, and using a commercial asynchronous motor, and any adjusted speed down to 10 percent of the maximum speed, could be kept constant, within the entire loading range from zero to full-load torque, to within ±2 percent.

I claim:

1. A control system for an alternating current motor such as a polyphase induction motor, the system comprising a voltage regulator for supplying a variable output voltage, an inverter for deriving from said output voltage an output alternating current for supply to said motor, a frequency regulator for controlling the frequency of operation of said inverter, first means to derive a first voltage value in dependence upon the current supplied by said inverter to said motor, means for subtracting said first voltage value from the output voltage of said voltage regulator to obtain a first corrected voltage value which is used for regulating the output voltage of the voltage regulator, means to derive a second voltage value in dependence upon the current supplied by said inverter to said motor, and means for subtracting said second voltage value from the output voltage of the voltage regulator to obtain a second corrected voltage value which is used for regulating at the frequency of operation of said inverter.

2. A control system according to claim 1 further comprising an inductor connected in series with said motor so that in operation the current supplied by said inverter to said motor flows also in said inductor, rectifier means connected to said inductor, and a resistor connected to said rectifier means whereby the voltage developed across said resistor is dependent on the current flowing in said inductor, said first and second voltage values being derived from respective tappings on said resistor.

3. A control system according to claim 1 wherein said rectifier means is a bridge rectifier having two pairs of opposite terminals, one terminal being connected to said resistor, the opposite terminal being connected to said inductor, and the other two opposite terminals being connected by way of respective inductors to respective input terminals across which in operation is supplied an alternating current of constant amplitude, said respective inductors being coupled to said first-mentioned inductor.

* * * * *